United States Patent [19]

Erdman

[11] Patent Number: 4,763,347
[45] Date of Patent: Aug. 9, 1988

[54] CONTROL SYSTEM, ELECTRONICALLY COMMUTATED MOTOR SYSTEM, BLOWER APPARATUS AND METHODS

[75] Inventor: David M. Erdman, Fort Wayne, Ind.

[73] Assignee: General Electric Company, Fort Wayne, Ind.

[21] Appl. No.: 15,409

[22] Filed: Feb. 17, 1987

Related U.S. Application Data

[63] Continuation-in-part of Ser. No. 463,147, Feb. 2, 1983, Pat. No. 4,654,566, which is a continuation-in-part of Ser. No. 412,421, Aug. 27, 1982, Pat. No. 4,449,079, which is a continuation of Ser. No. 141,267, Apr. 17, 1980, abandoned, which is a continuation-in-part of Ser. No. 77,656, Sep. 21, 1979, abandoned, which is a continuation-in-part of Ser. No. 802,484, Jun. 1, 1977, Pat. No. 4,169,990, which is a continuation-in-part of Ser. No. 729,761, Oct. 5, 1976, abandoned, which is a continuation-in-part of Ser. No. 482,409, Jun. 24, 1974, Pat. No. 4,005,347.

[51] Int. Cl.$^4$ ............................................. H02P 6/02
[52] U.S. Cl. .................................................. 318/254
[58] Field of Search .............. 318/138, 254, 334, 430, 318/431, 439, 599; 361/23, 24, 25; 363/49

[56] References Cited

U.S. PATENT DOCUMENTS

| | | | |
|---|---|---|---|
| 3,274,471 | 9/1966 | Moczala | 318/138 |
| 3,290,572 | 12/1966 | Hartmann et al. | 318/138 |
| 3,359,474 | 12/1967 | Welch et al. | 318/138 |
| 3,384,801 | 5/1968 | Rodgers | 318/334 |
| 3,488,566 | 1/1970 | Fukuda | 318/138 |
| 3,700,987 | 10/1972 | Deering | 318/227 |
| 3,783,357 | 1/1974 | Ichiyanage | 318/138 |
| 3,783,359 | 1/1974 | Malkiel | 318/254 |
| 3,839,661 | 10/1974 | Wada | 318/138 |
| 3,896,357 | 7/1975 | Tanikoshi | 318/254 |
| 3,906,320 | 9/1975 | Doemen | 318/331 |
| 3,999,108 | 12/1976 | Tanikoshi | 318/138 |
| 4,030,005 | 6/1977 | Doemen | 318/138 |
| 4,064,443 | 12/1977 | Yamada et al. | 318/331 |
| 4,233,549 | 11/1980 | Dighe | 318/317 |
| 4,250,435 | 2/1981 | Alley et al. | 318/138 |
| 4,368,411 | 1/1983 | Kidd | 318/254 |
| 4,403,177 | 9/1983 | Weber et al. | 318/254 |
| 4,459,519 | 7/1984 | Erdman | 318/254 |
| 4,491,770 | 1/1985 | Gotou | 318/254 |
| 4,491,771 | 1/1985 | Kimura | 318/254 |
| 4,500,821 | 2/1985 | Bitting | 318/254 |
| 4,510,422 | 4/1985 | Ogura | 318/254 |
| 4,544,868 | 10/1985 | Murty | 318/254 |
| 4,629,959 | 12/1986 | Okuyama et al. | 318/727 |
| 4,631,458 | 12/1986 | Furuichi | 318/138 X |
| 4,633,150 | 12/1986 | Inaji et al. | 318/254 |
| 4,642,537 | 2/1987 | Young | 318/254 |

FOREIGN PATENT DOCUMENTS

| | | |
|---|---|---|
| 0071941 | 2/1983 | European Pat. Off. . |
| 57-80263 | 5/1982 | Japan ......... 363/49 |
| 2068664A | 8/1981 | United Kingdom . |
| 2126026A | 3/1984 | United Kingdom . |

OTHER PUBLICATIONS

SCR Manual, GE 1979, pp. 259, 262, 263, Sixth Ed.

*Primary Examiner*—Bentsu Ro
*Attorney, Agent, or Firm*—Ralph E. Krisher, Jr.

[57] ABSTRACT

Control system for an electronically commutated motor having a stationary assembly with a plurality of winding stages and further having a rotatable assembly. The control system is adapted to be supplied with an externally derived first pulse width modulated series of pulses having a first duty cycle which is subject to sudden changes which would cause a substantial inrush current to the motor if used directly for control purposes. The control system includes circuitry for generating a second series of pulses and modulating their width in response to the first series of pulses to produce a second pulse width modulated series of pulses that has a second duty cycle which varies less rapidly over time than the first duty cycle varies when the first duty cycle changes suddenly. Further included is circuitry for applying a voltage to one or more of the winding stages at a tine in accordance with the second pulse width modulated series of pulses and commutating the winding stages in a preselected sequence to rotate the rotatable assembly. In this way, inrush current to the motor is substantially reduced when the first duty cycle changes suddenly. Further control circuitry, electronically commutated motor systems, blower apparatus and methods are also disclosed.

57 Claims, 6 Drawing Sheets

CONTROL SYSTEM, ELECTRONICALLY COMMUTATED MOTOR SYSTEM, BLOWER APPARATUS AND METHODS

CROSS REFERENCE TO RELATED APPLICATIONS

This application is a continuation-in-part of copending application Ser. No. 463,147 filed Feb. 2, 1983 (now U.S. Pat. No. 4,654,566) which is a continuation-in-part of Ser. No. 412,421 filed Aug. 27, 1982 (now U.S. Pat. No. 4,449,079) which is a continuation of application Ser. No. 141,267 filed Apr. 17, 1980 (now abandoned) which was a continuation-in-part of application Ser. No. 077,656 filed Sept. 21, 1979 (now abandoned) which was a continuation-in-part of application Ser. No. 802,484 filed June 1, 1977 (now U.S. Pat. No. 4,169,990) which was a continuation-in-part of application Ser. No. 729,761 filed Oct. 5, 1976 (now abandoned) which was a continuation-in-part of application Ser. No. 482,409 filed June 24, 1974 (now U.S. Pat. No. 4,005,347). Each of the aforementioned applications and patents are commonly assigned and the entire disclosures thereof are respectively incorporated by reference herein.

This application is also related to coassigned U.S. Pat. Nos. 4,015,182; 4,162,435: 4,459,519; 4,528,485 and 4,532,459. The entire disclosures of each of these patents are also specifically incorporated herein by reference.

FIELD OF THE INVENTION

This invention relates in general to dynamoelectric machines, control systems and application systems for such machines and to methods of their control and operation. More particularly, this invention relates to control systems for an electronically commutated motor, electronically commutated motor systems, blower apparatus, and methods of their control and operation.

BACKGROUND OF THE INVENTION

While conventional brush-commutated DC motors may have advantageous characteristics, including convenience of changing operational speeds, there may be disadvantages such as brush wear, electrical loss, noise and radio frequency interference caused by sparking between the brushes and the segmented commutator, which may limit the applicability of such brush-commutated DC motors in some fields such as the vehicular blower control field. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. Such electronically commutated motors are disclosed in the David M. Erdman U.S. Pat. Nos. 4,015,182 and 4,459,519, for instance. These electronically commutated motors are advantageously employed, for instance, in air conditioning for cooling and warming of vehicular compartments.

In an automotive temperature control system a variable resistance can be used to vary the speed of a brush-type blower motor, but this would further reduce the energy efficiency of the system. While there are some losses engendered by electronic switching of an electronically commutated motor, these are negligible compared to brush losses and rheostat losses in prior art variable speed blower systems.

Further improvements in control systems, electronically commutated motor systems, blower apparatus and methods of control and operation can beneficially contribute to more widespread use of such motors in various applications including vehicular blower control. For example, sudden changes in the blower speed control setting can lead to wasted electrical energy due to an inrush current to the motor and produce annoying air sounds as the operating level is changed. Improvements which achieve increased electrical efficiency and user convenience would be desirable. Economy of manufacture would also be enhanced by circuit improvements if they can be made with little extra cost as part of improved integrated circuit chips. Greater versatility of response to various control signal conditions and improved fail-safe features would also be desirable.

SUMMARY OF THE INVENTION

Among the objects of this invention are to provide an improved control system for an electronically commutated motor, an improved electronically commutated motor system, improved blower apparatus and improved methods of control and operation which overcome at least some of the disadvantageous conditions discussed above; the provision of an improved control system for an electronically commutated motor, an improved electronically commutated motor system, improved blower apparatus and improved methods of control and operation which substantially reduce inrush current to the motor when a blower speed setting is abruptly changed; the provision of an improved control system for an electronically commutated motor, an improved electronically commutated motor system, improved blower apparatus and improved methods of control and operation which substantially reduce annoyance to passengers from extraneous air noise changes when a blower speed setting is abruptly changed; the provision of an improved control system for an electronically commutated motor, an improved electronically commutated motor system, improved blower apparatus and improved methods of control and operation which are self-monitoring for abnormal control conditions and for control levels which are not interpretable as motor speed commands; and the provision of an improved control system for an electronically commutated motor, an improved electronically commutated motor system, improved blower apparatus and improved methods of control and operation which are electrically efficient, reliable, economical and convenient in use.

Generally, one form of the invention is a control system for an electronically commutated motor having a stationary assembly with a plurality of winding stages and further having a rotatable assembly. The control system is adapted to be supplied with an externally derived first pulse width modulated series of pulses having a first duty cycle which is subject to sudden changes which would cause a substantial inrush current to the motor if used directly for control purposes. The control system includes circuitry for generating a second series of pulses and modulating their width in response to the first series of pulses to produce a second pulse width modulated series of pulses that has a second duty cycle which varies less rapidly over time than the first duty cycle varies when the first duty cycle changes suddenly. Further included is circuitry for applying a voltage to one or more of the winding stages at a time in accordance with the second pulse width modulated series of pulses and commutating the winding stages in a preselected sequence to rotate the rotatable assembly. In this way, inrush current to the motor is substantially reduced when the first duty cycle changes suddenly.

Another form of the invention is a control system for an electronically commutated motor having a stationary assembly with a plurality of winding stages and further having a rotatable assembly. The control system is adapted to be supplied with an externally derived first pulse width modulated series of pulses having a varying first duty cycle. The control system includes circuitry for generating a second series of pulses and modulating their width in response to the first series of pulses to produce a second pulse width modulated series of pulses and a circuit for applying a voltage to one or more of the winding stages at a time in accordance with the second pulse width modulated series of pulses and commutating the winding stages in a preselected sequence to rotate the rotatable assembly. A resettable circuit counts the second series of pulses to produce a particular electrical output only when a predetermined number is reached and repeatedly resets itself so that the predetermined number is not reached unless the first series of pulses becomes a substantially constant voltage that persists for a first time period during which the predetermined number of pulses in the second series of pulses occur. A further circuit responds to an occurrence of the particular electrical output for preventing the second pulse width modulated series of pulses from actuating the circuit for applying and commutating.

A further form of the invention is a control system for an electronically commutated motor having a stationary assembly with a plurality of winding stages and further having a rotatable assembly. The control system includes circuitry for deriving a first pulse width modulated series of pulses having a width-to-period ratio that is subject to high rates of change that could produce motor current transients if the pulses were used directly for control purposes. Combined with the deriving circuitry is a circuit for generating a second series of pulses and modulating their width in response to the first series of pulses to produce a second pulse width modulated series of pulses that has a second width-to-period ratio limited in its rate-of-change to less than a predetermined value regardless of the rate of change of the width-to-period ratio of the first series of pulses. Further included in the control is a circuit for applying a voltage to the electric motor in accordance with the second pulse width modulated series of pulses and commutating the winding stages in a preselected sequence to rotate the rotatable assembly. In this way, motor current transients are substantially reduced when the width-to-period ratio of the first series of pulses undergoes a high rate of change. A further circuit prevents the second pulse width modulated series of pulses from actuating the circuit for applying and commutating when the first series of pulses becomes a substantially constant voltage, regardless of level, that persists for a predetermined period of time.

The invention comprehends electronically commutated motor systems and blower apparatus improved to include circuits of the types described above and other improvements. Also, various methods of the invention involve steps for accomplishing various aspects of control and operation of the circuits described above.

Other objects and features will be in part apparent and in part pointed out hereinafter.

BRIEF DESCRIPTION OF THE DRAWINGS

Corresponding reference characters refer to corresponding parts throughout the several views of the drawings.

DETAILED DESCRIPTION OF PREFERRED EMBODIMENTS

Figure 1:
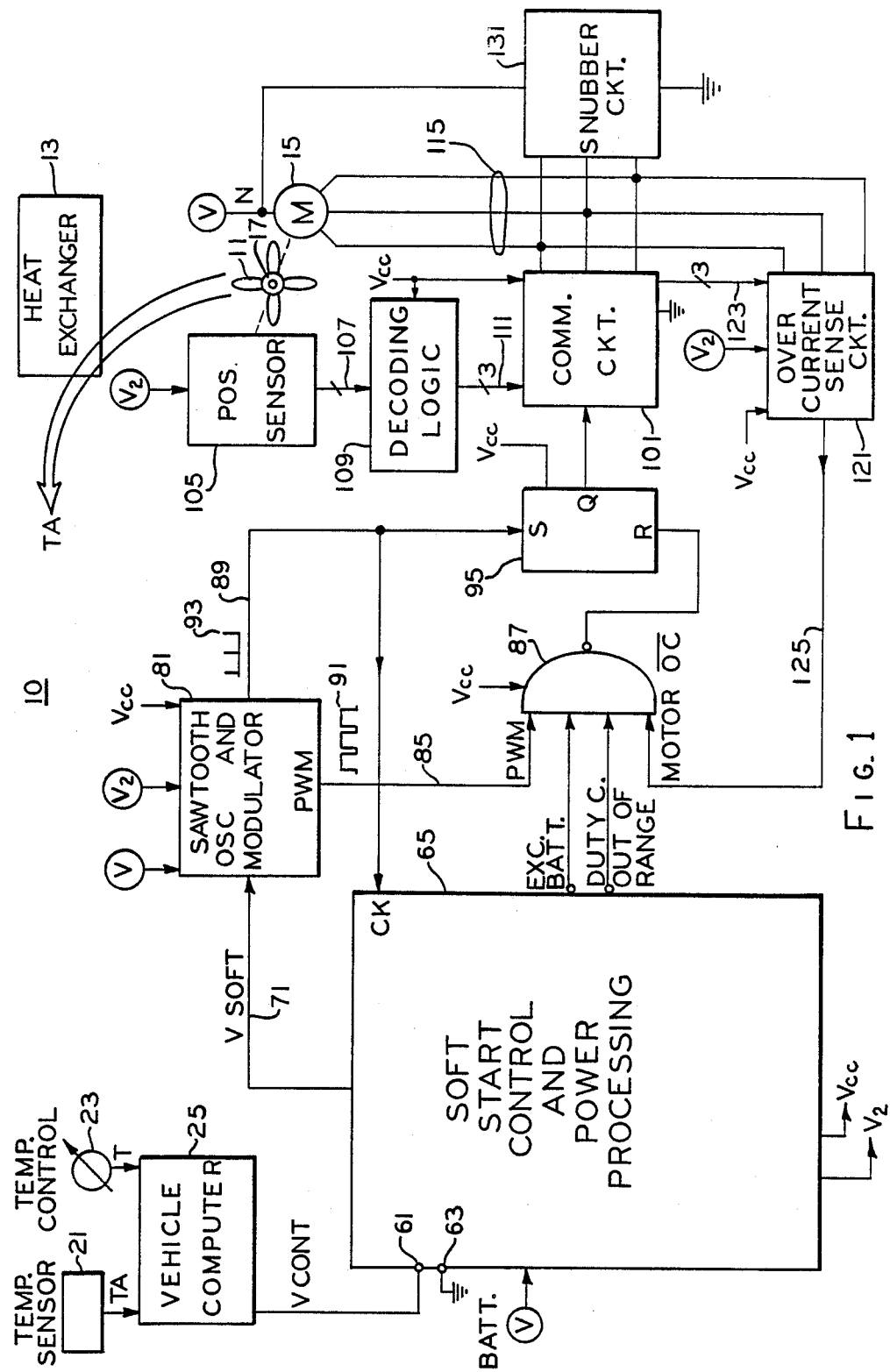
FIG. 1 is a block diagram of blower apparatus of the invention having an electronically commutated motor system of the invention with an inventive electronic control.

In FIG. 1 blower system 10 includes a fan 11 for moving air over a heat exchanger 13 to condition the air and thereby heat or cool a compartment by blowing conditioned air to it. An electronically commutated motor 15 has a stationary armature or assembly with a core and at least two energizable wye-connected winding stages such as the three winding stages shown in FIGS. 1 and 2 of parent case Ser. No. 463,147 incorporated by reference herein. The winding stages are arranged to establish a predetermined number of magnetic poles. A permanent magnet rotor as shown in FIG. 1 of said parent case 463,147 and coupled to fan 11 is adapted to rotate as a rotatable assembly in response to the magnetic poles established by the winding stages. An alternative motor has an exterior permanent magnet rotor 17 of FIG. 1 herein and an interior stator with the winding stages wound thereon.

A temperature sensor 21 senses the ambient temperature TA within the compartment. A temperature control 23 acts as a level setting means for variably setting a desired level of temperature T for the compartment. The temperature sensor 21 and temperature control 23 are both connected to a vehicle computer 25, which is a microcomputer mounted sturdily for rugged vehicular use.

Vehicle computer 25 is programmed as hereinafter described in FIG. 8 to derive a first pulse width modulated series of pulses VCONT. This first series of pulses VCONT has a first duty cycle which varies as a function of the difference between temperature TA and the desired level of temperature T which is set by temperature control 23. When heat exchanger 13 is the evaporator of an automotive air conditioner and the desired temperature T exceeds the ambient temperature TA, the first duty cycle is low or nil. On the other hand, when desired temperature T is set below ambient temperature TA, the duty cycle illustratively becomes greater in proportion to the difference between T and TA.

Figure 2:
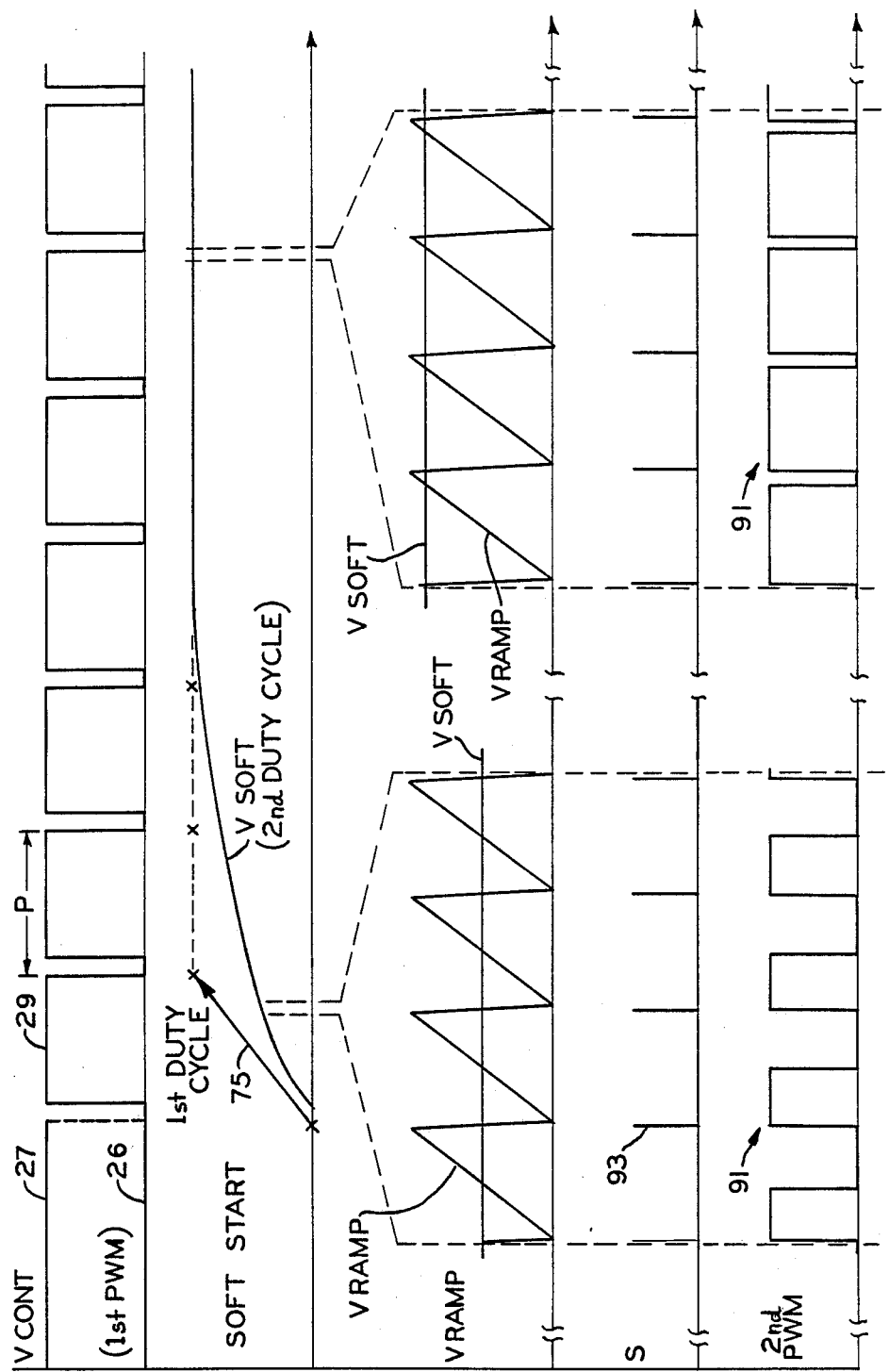
FIG. 2 is set of waveform diagrams for describing an inventive method used by the circuitry of FIG. 1 wherein the first two waveform diagrams correspond to a control voltage VCONT and a soft start voltage VSOFT drawn on the same time scale, and the last three waveform diagrams are drawn to a much-magnified time scale to illustrate operations during brief time intervals in the second waveform diagram.

As shown in FIG. 2 this first series of pulses VCONT is a pulse width modulated series of pulses which initially begin either with a long segment 26 having a low logic level (0% duty cycle) or with a long segment 27 having a high logic level (100% duty cycle). Duty cycle is herein regarded as the ratio of time-on or time high to a preestablished repetition period P of the series of pulses. A pulse width 29 or time-on period of each succeeding pulse of VCONT varies depending on the motor speed which the microcomputer 25 commands.

For purposes of this preferred embodiment, a 0% duty cycle or a 100% duty cycle is not representative of any motor speed command. Only when the duty cycle lies between predetermined limits such as 5–95% is the pulse width modulation (PWM) to be interpreted as indicating a motor speed proportional to the duty cycle of the pulse width modulation.

Vehicle computer 25 constitutes an example of a means for deriving a first pulse width modulated series of pulses having a first duty cycle varying as a function of the temperature and the desired level which first duty cycle is subject to sudden changes, such as when 0% segment 26 or 100% segment 27 ends. Moreover, a passenger in the vehicle can switch the temperature control 23 full on or full off or abruptly alter its setting so that the first duty cycle is subject to sudden changes. These sudden changes would cause a substantial inrush current or motor current transient to electronically commutated motor 15 if the first series of pulses were used directly for control purposes.

Figure 3:
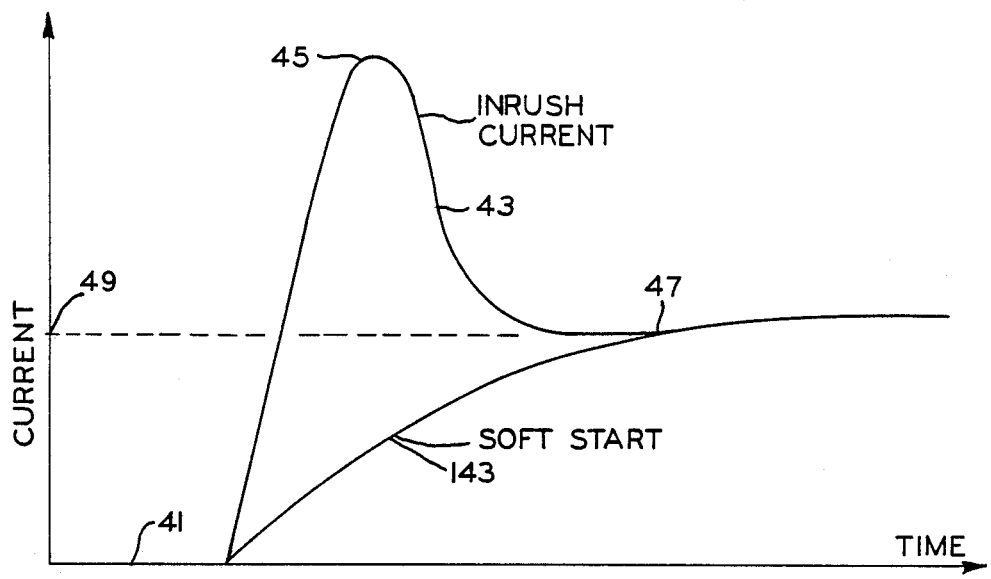
FIG. 3 is a graph of motor current versus time showing inrush current eliminated by the inventive circuitry and methods.

FIG. 3 shows an example of motor current if a varying duty cycle PWM were suddenly applied to the electronically commutated motor 15. At first when the duty cycle is 0, no current flows in the motor 15 as indicated by a line segment 41. Next, the temperature control 23 of FIG. 1 is abruptly increased to call for full speed motor operation such as when a driver of the vehicle operates it on a hot summer day. At such time, a sudden inrush current 43 or motor current transient occurs which reaches a peak level 45. This peak level is disadvantageously higher than any current which the motor experiences in its normal steady state operation represented by current portion 47.

Current transient 43 represents an inrush of current into the inductance and resistance of the winding stages of the electronically commutated motor 15. Significant electrical losses occur. The rotatable assembly, which as yet has not reached a new speed, induces no significant counter emf in the winding stages when peak 45 occurs. The speed of the rotatable assembly then rises sufficiently to induce substantial counter emf, current portion 47 is reached, and the motor current has a level 49 which depends on the motor load torque. The new steady state motor speed is determined by supply voltage V and the duty cycle of the first series of pulses VCONT.

Figure 4:
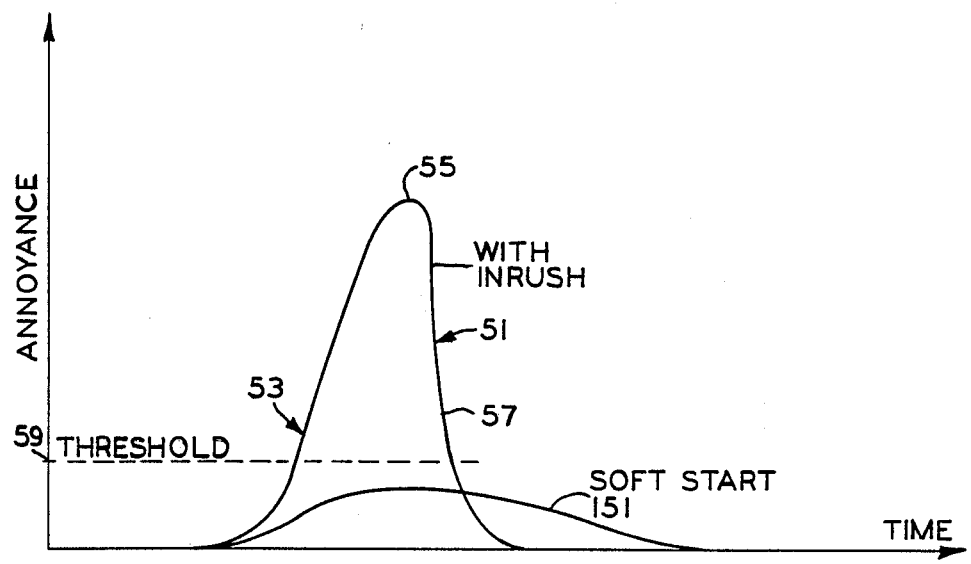
FIG. 4 is a graph of subjective annoyance versus time, showing annoyance reduced below a perception threshold by the inventive circuitry and methods.

FIG. 4 shows a curve 51 of subjective annoyance to the vehicle driver and to passengers by sudden changes in fan motor speed due to the action of the inrush current 43 of FIG. 3. In general fan motor speed v is determined experimentally, or can be approximated by solving the following differential equation:

$$I(t) = M\,dv/dt + rv \quad (1)$$

where I(t) is electrical current, (proportional to torque), v is motor speed, dv/dt is rate of change of speed, M is proportional to moment of inertia of the rotor and r is proportional to frictional resistance of air and bearings.

Annoyance A is regarded as being proportional to the fan motor speed v itself, and the sound emitted by the fan is nil when the speed is zero. Also, annoyance A is taken as proportional to the rate of change of motor speed because at high speeds a *change* of speed is perceptible as an annoying variation in sound being produced by the fan. Annoyance A for present purposes is therefore given by the formula $$A = v\,dv/dt. \quad (2)$$

To determine annoyance curve 51 of FIG. 4, current curve 43 of FIG. 3 is used as the current function I(t) in Equation (1), which is solved for speed v as a function of time. Then speed v so determined is substituted into equation (2) to obtain annoyance A curve 51 as a function of time. (It is to be emphasized that the utility and advantages of the invention do not depend on the exact equations used in this theory example which is provided for illustrative purposes.)

FIG. 4 shows that when the inrush current 43 occurs, the product of the fan speed and the rate of change of speed rises suddenly in a segment 53, reaches a maximum 55 and falls rapidly in a segment 57. Human listeners have a perception threshold level 59. The actual perceived annoyance is that portion of the annoyance curve 51 which lies above a dashed line at threshold level 59.

When the fan speed v undergoes sudden changes, there are thus instances of annoyance above threshold 59 to the passengers. $I^2R$ electrical losses and heating in the winding stages of the motor 15 also disadvantageously accompany the inrush current 43 of FIG. 3.

Returning to FIG. 1, the motor 15 is inventively controlled in a manner which substantially limits and reduces the inrush current 43 and essentially eliminates sudden changes in fan speed v that produce annoyance A.

In FIG. 1 vehicle computer 25 applies voltage VCONT across a pair of terminals 61 and 63. Terminal 61 is connected directly to the vehicle computer and terminal 63 is connected to common. Terminals 61 and 63 are input terminals for a Soft Start Control and Power Processing Circuit 65 for the externally derived first PWM series of pulses. Circuit 65, which is supplied with nominal 12–14 volt battery voltage V, produces a logic supply voltage VCC and a controlled voltage V2 for other power supply purposes as discussed hereinbelow.

Circuit 65 also importantly produces a running average of voltage VCONT as a voltage VSOFT on a line 71. FIG. 2 shows a waveform of voltage VSOFT which is provided for soft start purposes. The actual duty cycle of the first series of pulses comprising VCONT in FIG. 2 is graphically depicted as a series of x's corresponding to a ratio of pulse width-to-period after each repetition period P. The duty cycle is subject to a sudden change, or high rate of change, as indicated by arrow 75. Voltage VSOFT advantageously changes relatively gradually over several repetition periods P of the first series of pulses VCONT until it reaches a level proportional to the first duty cycle.

In FIG. 1 Soft Start Control and Power Processing circuit 65 feeds VSOFT on line 71 to a sawtooth oscillator and modulator 81 which produces a second pulse width modulated series of pulses 91 on a line 85 to a NAND gate 87. The second PWM series of pulses 91 have a higher repetition rate (about 100 times higher) than the first series of pulses VCONT. Circuit 81 is powered by battery voltage V, controlled voltage V2 and logic voltage VCC. Circuit 81 further produces a series of very short setting pulses 93 on a line 89 which are simultaneous with the rising transitions of the second pulse with modulated series of pulses 91 on line 85. These setting pulses 93 are connected by line 89 to a set (S) input of an RS flip-flop 95 and to an input labeled CK of Soft Start Control and Power Processing Circuit 65.

Circuit 65 further produces disabling low logic levels to NAND gate 87 respectively indicative of excessive battery voltage (EXC. BATT.), and Duty Cycle Out of Range when these conditions occur. An output of NAND gate 87 is connected to a high-active reset (R) input of flip-flop 95. Unless flip-flop 95 is held reset, a Q output of flip-flop 95 normally feeds a commutation circuit 101 with the second pulse width modulated series of pulses.

Commutation circuit 101 acts as a means for applying the voltage V to one or more of the winding stages of motor 15 at a time in accordance with the second pulse width modulated series of pulses and commutates the winding stages in a preselected sequence to rotate the rotatable assembly of motor 15 and the fan 11 with a variable speed to blow conditioned air to the compartment at a rate related to the duty cycle of the second pulse width modulated series of pulses.

Associated with motor 15 is a position sensor 105. A variety of alternative circuits are usable in sensor 105, including Hall effect circuits, optical position sensing circuits, and shaft encoder apparatus. Also, winding stage back emf detection circuits are discussed as position sensors in the cross-referenced predecessor applications and patents.

For example, a set of Hall effect sensors in circuit 105 produce a series of three-phase pulses which are supplied along three lines 107 to a decoding logic circuit 109. Decoding logic circuit 109 in turn provides nonoverlapping pulses on three additional output lines 111 to commutation circuit 101. Commutation circuit 101 in this preferred embodiment connects three winding stage lines 115 in turn to common. Circuits 105 and 109 are examples respectively of means for sensing angular position of the rotatable assembly and means for providing to said applying and commutating means a commutation signal indicative of a predetermined angular position of the rotatable assembly when the rotatable assembly reaches the predetermined angular position.

A neutral supply line N connected to each of the winding stages of motor 15 is connected to battery voltage V. Consequently, connecting each of the winding stage lines 115 to common by operation of commutation circuit 101 suffices to apply battery voltage to the corresponding winding stage, energizing it and causing the rotatable assembly connected to fan 11 to turn.

Lines 115 are also connected to inputs of an overcurrent sensing circuit 121 which is powered by logic voltage VCC and controllable power voltage V2. A set of three disable lines 123 to circuit 121 from commutation circuit 101 select each of the lines 115 to be sensed in turn for overcurrent purposes. When an overcurrent in excess of a predetermined maximum value is detected, an output low occurs on a low-active output line 125 from circuit 121 to an input of NAND gate 87 marked MOTOR $\overline{OC}$. In this way, circuit 121 acts as an example of a means for preventing the second pulse width modulated series of pulses from actuating the means for applying and commutating when a level of electrical current in one or more of the winding stages exceeds a predetermined value. When any of the four inputs to NAND gate 87 goes low the output of NAND gate 87 goes high, resetting flip-flop 95 and returning its Q output low to deenergize motor 15.

Associated with motor 15 is a snubber circuit 131 which recovers energy from each winding stage that becomes deenergized in sequence. This energy is partially returned to the battery supply to neutral N. Snubber circuit 131 conserves energy, reduces voltage transients on the lines 115 and protects switching transistors in commutation circuit 101. Snubber circuit 131 thus is an example of means connected to each of the switching transistors for recovering energy released by a decaying magnetic field of each deenergized winding stage when switching occurs.

By using a second PWM series of pulses 91 related to the first PWM series of pulses VCONT through the intermediate averaging voltage VSOFT, inrush current to the motor 15 is substantially reduced when the first duty cycle changes suddenly. The voltage VSOFT of FIG. 2 controls the duty cycle of the pulses 91 produced by circuit 81 of Fig. 1, as described. As a result of this controlled second pulse width modulated series of pulses 91 a soft start current 143 (FIG. 3) flows in the electronically commutated motor 15. Advantageously, the inrush current 43 is substantially reduced or eliminated.

Further, as shown in FIG. 4, a soft start curve 151 for annoyance A is advantageously low and even below threshold of perception 59. Accordingly, annoyance to driver and passengers by sudden changes in fan speed is reduced or substantially eliminated and the inrush current and associated $I^2R$ losses and heating are reduced or substantially eliminated as well.

Figure 5:
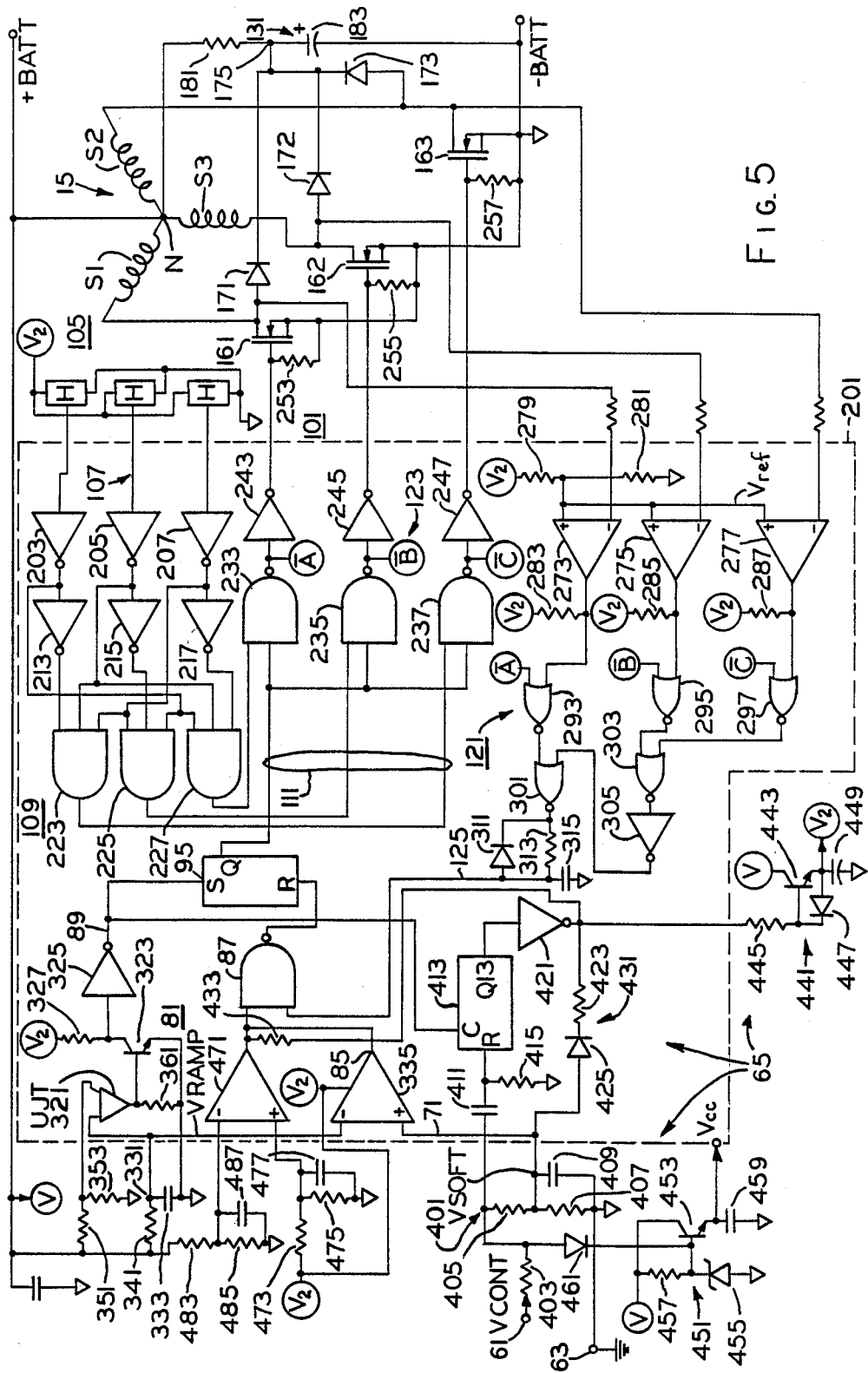
FIG. 5 is a schematic diagram of an inventive electronically commutated motor system which forms part of the inventive blower apparatus shown in the FIG. 1 block diagram.

A specific circuit implementation of the block diagram of FIG. 1 is shown in FIG. 5. A positive battery line (+BATT) provides a voltage V for application to a neutral N of the motor 15. The motor 15 has three winding stages S1, S2 and S3 connected in common to neutral N. The winding stages also have terminals respectively connected to source electrodes of three field effect transistors (FETs) 161, 162 and 163. The drain and substrate connections of the FETs 161, 162 and 163 are all connected to a circuit common at a negative battery line or common line (−BATT). Any of a variety of types of switching transistors can be used for the purpose, such as bipolar transistors, FETs, thyristors including insulated gate thyristors (IGTs), and other devices.

The winding stages S1, S2 and S3 are also respectively connected to anodes of three diodes 171, 172 and 173, the cathodes of which are connected together to a point 175. Diodes 171, 172 and 173 are included in snubber circuit 131 along with a resistor 181 connected to neutral line N and a capacitor 183 connected to common. Resistor 181 and capacitor 183 are connected in series and their series connection is at point 175.

Most of the control circuitry to run motor 15 is suitably fabricated on a custom integrated circuit chip 201 using CMOS (complimentary metal oxide semiconductor) technology. Three Hall effect sensors 105 associated with motor 15 are supplied with a controlled powering voltage V2 and they in turn produce three-phase outputs mutually displaced by 120 electrical degrees on three lines 107 to decoding logic 109 on the chip 201.

Decoding logic 109 includes three inverters 203, 205 and 207 the outputs of which are respectively connected to the inputs of a further set of three inverters 213, 215 and 217. (All logic gates and inverters on chip 201 are supplied with voltage VCC except where a connection to voltage V2 is shown. Accordingly, numerous connections to VCC are omitted from the drawing for clarity.) The outputs of the inverters 213, 215 and 217 are in turn respectively connected to one input each of a set of three 3-input AND gates 223, 225 and 227. In addition, the outputs of inverters 203, 205 and 207 are respectively connected to inputs of pairs of the AND gates. Specifically, the output of inverter 203 is connected to another input of AND gate 225 and AND gate 227. The output of inverter 205 is connected to another input of AND gates 223 and 227. The output of inverter 207 is connected to another input of AND gates 223 and 225.

The outputs of AND gates 223, 225 and 227 in decoding circuit 109 are connected via lines 111 respectively to three NAND gates 233, 235 and 237 in commutation circuit 101. Flip-flop 95 also has its Q output connected to an additional input of each of NAND gates 233, 235 and 237. The outputs of NAND gates 233, 235 and 237 are in turn connected to the inputs of three inverters 243, 245 and 247 the outputs of which are connected to the gates of FETs 161, 162 and 163 with bypass resistors 253, 255 and 257 respectively connected between each gate and common. NAND gates 233, 235 and 237 have low-active outputs respectively designated $\overline{A}$, $\overline{B}$ and $\overline{C}$, which are connected by three lines 123 to overcurrent sensing circuit 121.

In overcurrent sensing circuit 121 three comparators 273, 275 and 277 respectively have their inverting (−) inputs resistively connected to the source terminals of FETs 161, 162 and 163 for sensing the saturation voltage which is developed in the FETs by motor current flowing through each of them. If the saturation voltage produced in a selected FET by the motor current exceeds a predetermined value, the motor current is presumed to be excessive and corrective action is taken.

Noninverting (+) terminals of each of comparators 273, 275 and 277 are connected to a voltage divider consisting of resistors 279 and 281 connected in series between controlled voltage V2 and common. In this way the voltage output of the voltage divider acts as a reference voltage Vref to which the saturation voltage of each of the FETs is compared.

The outputs of comparators 273, 275 and 277 have respective pullup resistors 283, 285 and 287 to controlled voltage V2, and the outputs are further respectively connected to an input of each of NOR gates 293, 295 and 297. Each NOR gate 293, 295 and 297 has a second input which is respectively enabled by a low on line $\overline{A}$, $\overline{B}$ or $\overline{C}$ from commutation circuit 101. Only one of the NOR gates 293, 295 and 297 is thus supplied at any one time with an enabling low.

In this way NOR gates 293, 295 and 297 selectively ignore each comparator 273, 275 or 277 connected to a FET 161, 162 or 163 which is not presently conducting. This feature is important because the back emf from an unenergized one of the winding stages can otherwise be mistakenly interpreted as excessive saturation voltage in the corresponding FET. Put another way, position sensor 105, decoding logic 109 and lines $\overline{A}$, $\overline{B}$ and $\overline{C}$ are an example of a means for providing to the preventing means a signal depending on the angular position of the rotatable assembly, the signal identifying each switching transistor which is switched on so that the preventing means is responsive only to voltage across each switching transistor that is switched on.

In overcurrent sensing circuit 121, the output of NOR gate 293 is connected to an input of a NOR gate 301. The outputs of NOR gates 295 and 297 are connected to respective inputs of another NOR gate 303 the output of which is connected through an inverter 305 to a second input of NOR gate 301. NOR gates 301 and 303 with inverter 305 act as a three input NOR gate with its inputs respectively connected to the outputs of NOR gates 293, 295 and 297. The output of NOR gate 301 is connected to the cathode of a diode 311 the anode of which is connected to an input of NAND gate 87. In this way a sensed overcurrent produces an output low at NOR gate 301 which is almost immediately communicated to NAND gate 87. However when the overcurrent ceases, the input to NAND gate 87 is held low for a time by an RC circuit consisting of a resistor 313 connected in series with a capacitor 315 between the output of NOR gate 301 and common. The series connection of resistor 313 with capacitor 315 is connected to the anode of diode 311.

Further in FIG. 5, sawtooth oscillator and modulator 81 includes a unijunction transistor UJT 321 the output of which is connected to the base of an NPN transistor 323. Transistor 323 has its emitter connected to common and its collector connected to the input of an inverter 325. A pullup resistor 327 is connected between the collector of transistor 323 and controlled voltage V2. The output of inverter 325 sends set pulses 93 of FIGS. 1 and 2 on line 89 in FIG. 5 to the set (S) input of flip-flop 95. UJT 321 acts as a sawtooth oscillator to produce a series of triangular pulses or ramp voltages VRAMP of FIG. 2 (which constitute a second series of pulses) on a line 331. Flip-flop 95 is set when each pulse VRAMP in the second series occurs. Line 331 connects an emitter of UJT 321 to a charging capacitor 333 and to an inverting (−) input of a comparator 335. The noninverting (+) input of comparator 335 is connected by line 71 to the Soft Start Control and Power Processing Circuit 65 in order to receive the soft start voltage VSOFT.

The operation of the sawtooth oscillator and modulator 81 is further described as follows. Charging capacitor 333 is connected in series with a resistor 341 between common and battery voltage V. As capacitor 333 charges, its voltage rises at the emitter of UJT 321 until it reaches a reference voltage established at a first base of UJT 321 by a voltage divider consisting of two resistors 351 and 353 connected between battery voltage V and ground. When the voltage across capacitor 333 exceeds the reference voltage, the UJT 321 fires and provides an output voltage spike across a resistor 361 to the base of transistor 323. The spike is sharpened and amplified by inverter 325 to produce a corresponding set output pulse 93 on line 89. When the spike is produced, the conductance of the emitter of UJT 321 suddenly increases across charging capacitor 333. Capacitor 333 is discharged suddenly, returning the ramp voltage VRAMP to zero. Each set pulse 93 on line 89 sets flip-flop 95, commencing a high portion of the pulse width modulated output (2nd PWM) to commutation circuit 101. Each 2nd PWM pulse 91 of FIG. 2 is terminated by comparator 335 when the ramp voltage VRAMP rises high enough to reach and exceed the soft start voltage VSOFT. At that time the output of comparator 335 goes low at an input of NAND gate 87, forcing the output of NAND gate 87 high at the reset input of flip-flop 95, resetting the flip-flop 95 and terminating the high Q output to commutation circuit 101.

Also, an overvoltage or overcurrent or Duty Cycle Out of Range condition forces NAND gate 87 output high and holds flip-flop 95 reset regardless of any 2nd PWM pulse 91. In other words comparator 335 and NAND gate 87 act as an example of a means for resetting the flip-flop no later than when each ramp voltage reaches the level of the control signal (e.g., VSOFT), but reset may occur earlier if an overvoltage or other condition causes it.

When VSOFT is moderately low in value (FIG. 2 middle waveform, left) the ramp voltage VRAMP reaches VSOFT quickly and the width of output pulses 91 on line 85 in FIGS. 1 and 2 is relatively small. On the other hand, when VSOFT is high (FIG. 2 middle waveform, right) it takes a much longer time for the voltage VRAMP to reach the level of VSOFT and the width of pulses 91 is relatively large.

The first series of pulses VCONT nominally have a repetition frequency that is in the range 10–200 Hertz, which corresponds to a repetition period in the range of 5–100 milliseconds. The instantaneous voltage of pulses VCONT is 12 volts or zero across terminals 61 and 63 and is supplied to an averaging circuit 401 which includes a series string of resistors 403, 405, and 407 connected between terminals 61 and 63. An averaging capacitor 409 is connected to common and across the resistor 407. Voltage VSOFT is the resulting voltage across capacitor 409. Line 71, which conducts VSOFT to the noninverting input of comparator 335, is connected to capacitor 409 and to the series connection of resistors 405 and 407.

The RC time constant of capacitor 409 with the series network of resistors 403, 405 and 407 is on the order of hundreds of milliseconds or on the order of seconds to effectively average the control voltage VCONT and produce the voltage VSOFT which acts as a control signal that varies in level corresponding to the duty cycle of VCONT. This average value level of VSOFT varies as the duty cycle of VCONT changes, except that VSOFT varies more slowly, gradually and smoothly.

As shown in FIG. 2 voltage VSOFT rises less rapidly than the duty cycle of the first pulse width modulated series of pulses VCONT. In general, VSOFT has a magnitude of rate of change which is at all times less than the magnitude of rate of change of the first duty cycle of VCONT. Moreover, the rate of change of VSOFT is always limited in magnitude to values less than a predetermined value proportional to the reciprocal of the time constant of the averaging circuit 401 of FIG. 5, regardless of the rate of change of the width-to-period ratio of VCONT.

Utilizing the circuitry discussed herein, Soft Start Control and Power Processing Circuit 65 together with sawtooth oscillator and modulator circuit 81 constitute an example of means for generating a second series of pulses and width-modulating them in response to a first series of pulses to produce a second pulse width modulated series of pulses that has a second duty cycle which varies less rapidly over time than the first duty cycle varies when the first duty cycle changes suddenly. In this way the disadvantageous effects of inrush current, motor current transients and annoyance to persons nearby are substantially reduced or eliminated as shown in FIGS. 3 and 4. Circuit 81 acts as a means for generating the second series of pulses and modulating their width in response to the control signal (e.g. VSOFT) to produce the second pulse width modulated series of pulses with the second duty cycle corresponding to the level of the control signal as it varies.

In a further protective control feature of the circuitry of FIG. 5, a voltage proportional to VCONT is coupled from a series connection of resistors 403 and 405 through a capacitor 411 to a reset input terminal of a 13-stage counter 413. A resistor 415 is connected between the reset terminal and common. A clock input to counter 413 is connected by the line 89 to the output of inverter 325. The Q13 output of counter 413 is connected to an inverter 421, the output of which is connected by a resistor 423 to the cathode of a diode 425. The anode of diode 425 is connected to line 71 and averaging capacitor 409.

The effect of the circuitry 431 which includes elements 411, 413, 415, 421, 423 and 425 is to provide a means of discharging averaging capacitor 409 when the terminals 61 and 63 present a substantially constant voltage for a predetermined period of time. In fact, circuitry 431 provides advantageous self-monitoring in chip 201 whenever the level of voltage which would ordinarily be pulse width modulated voltage VCONT goes either high (100% duty cycle) or low (0% duty cycle) or abnormally stays constant at a voltage value between preestablished logic levels such as 12 volts and 0 volts.

In any of such cases an abnormal cessation of pulses that lasts for a sufficiently long period times out counter 413 by causing the counter to reach a predetermined count or number. Counter 413 output goes high, forcing inverter 421 output low and discharging condenser 409 through resistor 423 and diode 425. Since condenser 409 is discharged, voltage VSOFT is forced to zero.

The clock input to counter 413 is fed at an approximately 20 Kilohertz rate by the pulses 93 from circuit 81. In one example, counter 413 is provided with the proper number of stages to time out in 200 milliseconds. In this way, there is plenty of time for counter 413 to be repeatedly reset by a rising transition in voltage VCONT through capacitor 411 so long as VCONT is pulsating. However, if VCONT ceases pulsating for approximately 200 milliseconds, which is a time that exceeds one repetition period of VCONT, no reset pulse is fed to the counter 413 and it times out and forces VSOFT low.

The circuitry 431 combined with AND gate 87 and flip-flop 95 thus provides resettable means for counting the second series of pulses to produce a particular electrical output only when a predetermined number is reached and repeatedly resetting itself so that the predetermined number is not reached unless the first series of pulses becomes a substantially constant voltage that persists for a time period during which the predetermined number of pulses in the second series of pulses occur, and means responsive to an occurrence of the particular electrical output for preventing the second pulse width modulated series of pulses from actuating the means for applying and commutating.

In a further advantageous feature, undesirable spikes in the output of comparator 335 are avoided when VSOFT is low because UJT 321 does not discharge the capacitor 333 completely. A low in voltage VSOFT is less than the discharge voltage of capacitor 333 and line 85 is effectively held at zero without spikes or erratic output from comparator 335.

In this way comparator 335, capacitor 333, unijunction transistor 321 and circuit 431 effectively act as a means for preventing the second pulse width modulated series of pulses from actuating the means for applying and commutating when the first duty cycle is less than a predetermined value.

As a further protective feature, a resistor 433 is connected between the output of inverter 421 and the same input of NAND gate 87 to which the output of comparator 335 is connected. Comparator 335 is an open-collector device, so that it is effectively disabled by a low output from inverter 421 which occurs when counter 413 times out. The just-mentioned input of NAND gate 87 goes low, preventing and interrupting further pulses to motor 15 via flip-flop 95 and commutation circuit 101 when the first series of pulses (e.g., VCONT) ceases pulsating for a predetermined period of time.

When inverter 421 in circuit 431 produces a protective low output a regulating circuit 441 is also deactuated. In regulating circuit 441 an NPN transistor 443 has its collector connected to battery voltage V and its emitter connected to supply controlled voltage V2. The base of transistor 443 is connected by a resistor 445 to the output of inverter 421. A protective diode 447 is connected between the base and emitter of transistor 443, its anode being connected to the emitter. A storage capacitor 449 is connected between the emitter and common. In this way, a controlled voltage V2 is prevented from being supplied to other parts of the circuitry as shown when voltage VCONT ceases pulsating, because inverter 421 forces the base of transistor 443 low. In normal operation, inverter 421 supplies an output high having a voltage approximately equal to voltage VCC. Transistor 443 provides a collector-emitter drop below battery voltage to regulate voltage V2 to about one diode drop below VCC.

An additional regulating circuit 451 includes NPN transistor 453 with its collector connected to battery voltage V and its emitter connected to supply a 9.4 volt supply voltage as voltage VCC to components on chip 201. The voltage VCC is regulated by a 10 volt Zener diode 455. Zener diode 455 is connected in series with a resistor 457 between battery voltage V and common. The base of transistor 453 is connected to the cathode of Zener diode 455. A storage capacitor 459 is connected between the emitter of transistor 453 and common. Voltage VCC is about one diode drop below the Zener voltage.

A diode 461 is connected with its anode to the junction of resistors 403 and 405 and its cathode connected to the base of transistor 453. In this way when VCONT is low between pulses, transistor 453 is momentarily shut off through diode 461 and capacitor 459 maintains VCC. However, if the pulses in VCONT cease and VCONT remains low, transistor 453 is caused to remain off. Capacitor 459 discharges and logic supply voltage VCC is thereby interrupted as a protective measure. Even if VCONT ceases pulsating and remains high so that transistor 453 remains on, circuit 431 advantageously prevents motor operation and turns off transistor 443 and voltage V2.

A protective circuit for detecting instances of overvoltage in the battery voltage V is provided by an open-collector comparator 471. The controlled voltage V2 is voltage-divided by a pair of resistors 473 and 475. A bypass capacitor 477 is connected across resistor 475 and to the noninverting (+) input of comparator 471. The battery voltage V is voltage divided by resistors 483 and 485. A bypass capacitor 487 is connected across resistor 485 and to the inverting (−) terminal of comparator 471.

If battery voltage V rises, the controlled voltage V2 does not change. This is because voltage V2 is regulated by transistor 443 in response to the voltage VCC at the output of inverter 421. Consequently, when the voltage-divided battery voltage V becomes excessive at the inverting terminal of comparator 471, the output of comparator 471 goes low. The output low from comparator 471 resets flip-flop 95 through NAND gate 87 and prevents the second pulse width modulated series of pulses from actuating the commutating circuit 101 and energizing any of the winding stages when the voltage to be applied to the winding stages exceeds a predetermined maximum value. That reset condition of flip-flop 95 is maintained by comparator 471 until the battery overvoltage condition ceases.

Since voltage V2 can be shut off by a counter 413 timeout when voltage VCONT ceases pulsating, the comparator 471 serves a further protective function. When voltage V2 is thus shut off at the noninverting input of comparator 471, the voltage (derived directly from battery) at the inverting input is not changed and comparator 471 also produces an output low to shut off the motor 15.

FIG. 5 shows an advantageous electronically commutated motor control that in the preferred embodiment operates from a nominal 12 volt battery source and supplies up to 30 amperes to an electronically commutated motor. The control uses position sensor 105 feedback and contains circuitry for overcurrent protection (circuit 121), PWM control to adjust motor speed (circuits 81, 87, 95), and circuitry 65 for soft start, reduced quiescent current when shut off, and digital interface for control from the vehicle computer 25.

Figure 6:
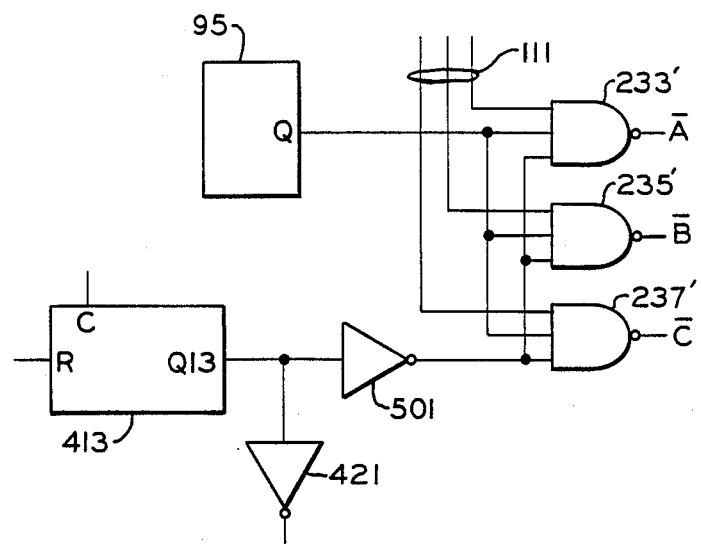
FIG. 6 is a schematic diagram of a modification to FIG. 5 for an alternative circuit for inhibiting motor commutation if control voltage VCONT of FIG. 2 becomes substantially constant for a predetermined time.

In an alternative circuit of FIG. 6 the circuitry of FIG. 5 is modified near counter 413 so that 3-input NAND gates 233', 235'. and 237' of FIG. 6 replace the 2-input NAND gates 233, 235 and 237 of FIG. 5. The third input of each of the NAND gates of FIG. 6 is fed with the output of an additional inverter 501 which has its input connected to the output of counter 413. In this way, a high at the output of counter 413 produces a low output from inverter 501 and disables all of the NAND gates 233', 235', 237' to remove energization from motor 15 by preventing commutation thereof.

In a further alternative connection for use with the circuit of FIG. 6, resistor 433 of FIG. 5 is optionally reconnected to be between the output of comparator 471 and controlled voltage V2.

Figure 7:
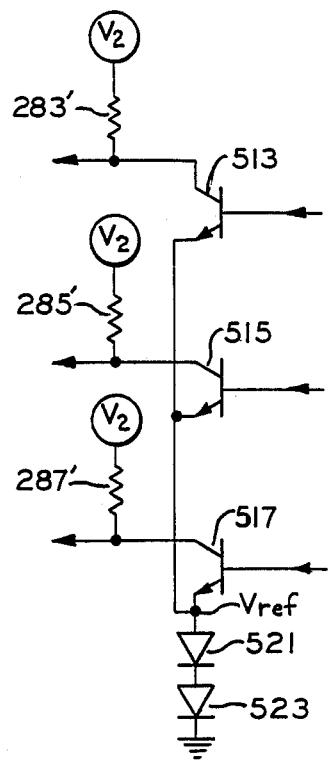
FIG. 7 is a schematic diagram of a modification to FIG. 5 for an alternative circuit using bipolar transistors as comparator circuitry to detect excessive motor current.

In a further alternative circuit of FIG. 7, NPN transistors 513, 515 and 517 replace comparators 273, 275 and 277 of FIG. 5. The bases of the transistors are resistively connected to the sources of FETs 161, 162 and 163 respectively. Each of the emitters of transistors 513, 515 and 517 is connected to the anode of a diode 521 the cathode of which is connected to the anode of a second diode 523. The cathode of diode 523 is connected to common. The flow of current through diodes 521 and 523 inherently forms a reference voltage Vref which makes the transistors 513, 515 and 517 act as comparators. Controlled voltage V2 is resistively connected to the collectors of transistors 513, 515 and 517 by respective resistors 283', 285' and 287'. The collectors of the transistors 513, 515 and 517 of FIG. 6 are connected in substitution for the outputs of comparators 273, 275 and 277 of FIG. 5.

Figure 8:
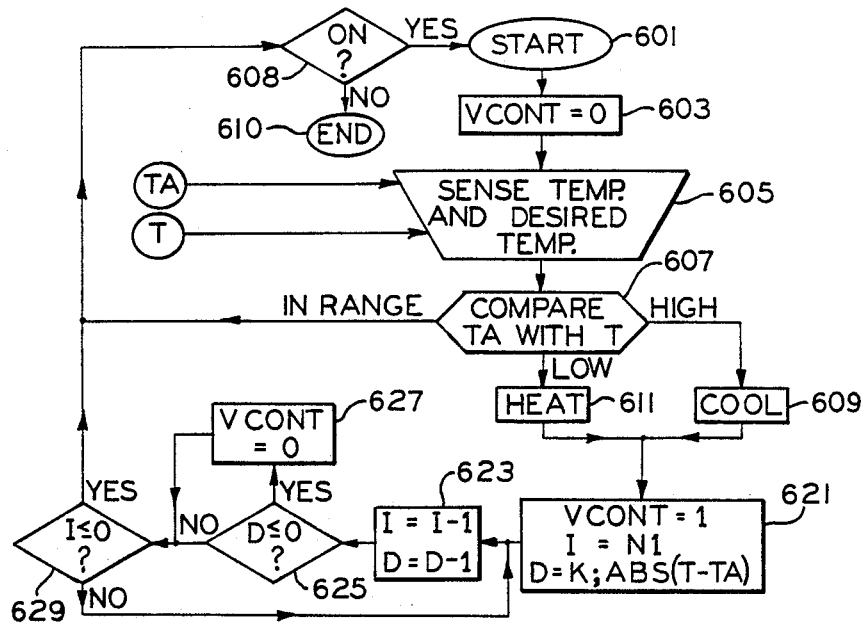
FIG. 8 is a diagram of steps of a method of operation of a vehicle computer of FIG. 1.

In FIG. 8 operations of vehicle computer 25 of FIG. 1 commence with a START 601 and proceed to set the level of control voltage VCONT to a logic low (zero) in a step 603. Then an input step 605 senses the ambient temperature TA from temperature sensor 21 of FIG. 1 and the desired temperature T from temperature control 23 by converting these inputs to digital form and appropriately scaling them. Next, in a decision step 607 ambient temperature TA is compared with the desired temperature T. If TA is within a predetermined range of illustratively +5% of desired temperature T then operations loop back to a step 608 and, if the computer 25 is "on", to START 601 to begin again. If in step 608 computer 25 is "off", operations terminate at an END 610.

When in decision step 607 ambient temperature TA is high compared to desired temperature T, operations proceed to produce a control signal in a step 609 which causes an evaporator of a vehicle air conditioner to be selected as the heat exchanger 13 of FIG. 1. If, on the other hand, ambient temperature TA is low compared to desired temperature T, then a branch is made from step 607 to a step 611 to select a heating coil as the heat exchanger 13 of FIG. 1. The operations of steps 609 and 611 are suitably accomplished by actuating and deactuating a solenoid valve to divert air flow through tubing to the selected type of heat exchanger.

After either of step 609 or step 611, operations proceed to a step 621 of FIG. 8 in which control voltage VCONT is set to a logic high (e.g., 12 volts). This corresponds to the onset of pulse 29 of FIG. 2. Further in step 621 a counter I is set to a predetermined value N1 which is illustratively 100. Also a temperature difference variable D is set equal to a preestablished constant K multiplied by the absolute value of the difference between desired temperature T and ambient temperature TA. K is suitably 10 when the temperatures are measured in degrees Celsius. After step 621 operations proceed to a step 623 to decrement the value of I and to decrement the temperature difference value D.

In a following decision step 625 the value of D is compared with 0. If D is less than or equal to 0 a branch is made to a step 627 to reset control voltage VCONT back to logic low whence a decision step 629 is reached. If D exceeds 0 in step 625, operations proceed directly to the step 629. In step 629 index I is compared with 0, and if I is less than or equal to 0 operations loop back to step 608 and START 601. Otherwise, if the index I is still greater than 0, operations branch from step 629 back to step 623 so that index I and temperature difference D are decremented again.

The effect of steps 623, 625, 627 and 629 is to hold control voltage VCONT high until temperature difference D is decremented to zero (0). When difference D becomes zero by decrementing before index I reaches 0, the control voltage VCONT drops low in step 627, thereby establishing the pulse width of one pulse of VCONT. Index I continues to decrement for the remainder of repetition period P of FIG. 2. In this way, the pulse width of VCONT, and its first duty cycle, are made generally proportional to temperature difference D of step 621.

However, if the magnitude of temperature difference (T−TA) exceeds a predetermined amount, difference D will equal or exceed value N1 in step 621. As a result, the value of VCONT is then high for the entire time that index I counts down and only briefly becomes low when a loop occurs and step 603 is reached again. Control voltage VCONT as thus produced is a first series of pulses which have a variable pulse width for motor speed control so that the duty cycle generally lies in a predetermined range between about 5% and 95%.

Figure 9:
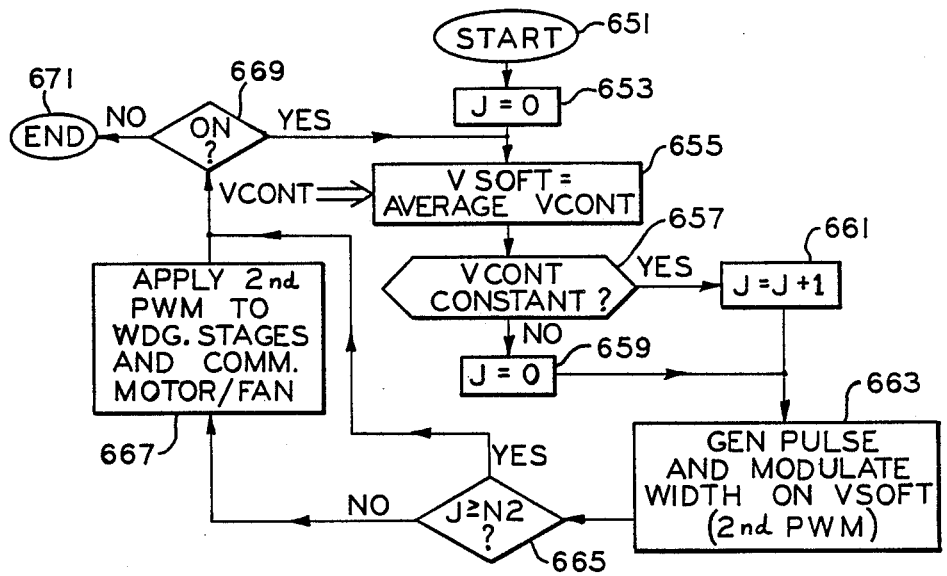
FIG. 9 is a diagram of steps of a method of operating the circuitry of FIG. 5.

In FIG. 9 operations commence in the circuitry of FIG. 5 with a START 651 and proceed to initialize a counter index J to 0 in a step 653. Then in a step 655 voltage VSOFT is produced by generating a running average of control voltage VCONT (FIGS. 1, 2 and 8) for a plurality (e.g., 3) of the preceding repetition periods P.

Next, in a step 657 control voltage VCONT is analyzed to determine whether it has remained substantially constant throughout the preceding repetition period P. If control voltage VCONT is pulsating normally it is not constant in step 657. If VCONT is not constant, operations proceed to a step 659 where index J is set to 0. Otherwise if pulsation of VCONT has ceased, operations proceed to a step 661 to increment index J by 1. Then operations proceed from either step 659 or step 661 to a step 663 to generate one or several pulses of the second series of pulses, which are width modulated in proportion to the value of the soft start voltage VSOFT.

After step 663 a decision step 665 compares index J with a second predetermined value N2 (e.g., corresponding to pulses in a time period of 200 milliseconds). If J does not equal or exceed N2, operations proceed to a step 667 to actually apply the second pulse width modulated series of pulses to the commutation circuitry 101 and energize motor 15. Next, a step 669 confirms that the circuitry is on, and loops back to step 665 whence the loop continues.

If in step 665 index J equals or exceeds N2 then operations bypass step 667 to discontinue or terminate the application of the second pulse width modulated series of pulses to the motor 15. Instead the operations proceed from step 665 to the step 669 in the loop of operations, and deenergize the motor 15. When control voltage VCONT begins pulsating again, index J is reinitialized in step 659 and the motor 15 is reenergized in step 667. In step 669 operations are terminated at an END 671 if the circuit is turned off.

Since FIG. 9 is equally representative of operations which can be programmed into a microcomputer, it is to be understood that the circuit of FIG. 5 can be modified to employ a microcomputer programmed to execute the operations of FIG. 9. In a microcomputer embodiment the running average is computed numerically. Normal pulsation of VCONT is determined by sensing whether values of instantaneous voltage in excess of 10 volts and less than 2 volts both occur in same repetition period P. Pulse width modulation of a second series of pulses is performed digitally in a manner similar to steps 623-629 of FIG. 8. Such microcomputer circuit is a further embodiment within the scope of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control system for an electronically commutated motor having a stationary assembly with a plurality of winding stages and further having a rotatable assembly, and which control system is to be supplied with an externally derived first pulse width modulated series of pulses having a first duty cycle which is subject to sudden changes which would cause a substantial inrush current to the motor if used directly for control purposes, the control system comprising:

means for generating a second series of pulses and means for modulating their width in response to the first series of pulses to produce a second pulse width modulated series of pulses that has a second duty cycle which varies less rapidly over time than the first duty cycle varies when the first duty cycle changes suddenly; and means for applying a voltage to one or more of the winding stages at a time in accordance with the second pulse width modulated series of pulses and commutating the winding stages in a preselected sequence to rotate the rotatable assembly, whereby inrush current to the motor is substantially reduced when the first duty cycle changes suddenly.

2. A control system as set forth in claim 1 wherein said means for modulating includes means for averaging the first series of pulses to produce a control signal having a level that varies when the first duty cycle changes, and means for modulating the second series of pulses in width in response to the control signal so that the second pulse width modulated series of pulses have the second duty cycle corresponding to the level of the control signal as it varies.

3. A control system as set forth in claim 2 wherein said means for averaging the first series of pulses includes terminals across which a resistance is connected in series with a capacitor, the first series of pulses being supplied to the terminals and a resulting voltage across said capacitor comprising the control signal.

4. A control system as set forth in claim 3 further comprising means for discharging said capacitor when the terminals have a substantially constant voltage for a predetermined period of time.

5. A control system as set forth in claim 1 wherein said means for generating includes means for producing the second series of pulses as a series of ramp voltages, and said means modulating includes means for averaging the first series of pulses to produce a control signal having a level that varies when the first duty cycle changes, a flip-flop, means for setting said flip-flop when each pulse in the second series occurs, and means for resetting said flip-flop no later than when each ramp voltage reaches the level of the control signal, said flip-flop having an output comprising the second pulse width modulated series of pulses.

6. A control system as set forth in claim 1 further comprising means for preventing the second pulse width modulated series of pulses from actuating said means for applying and commutating when the first duty cycle is less than a predetermined value.

7. A control system as set forth in claim 6 further comprising means for also preventing the second pulse width modulated series of pulses from actuating said means for applying and commutating when a level of electrical current in one or more of the winding stages exceeds a predetermined value.

8. A control system as set forth in claim 7 further comprising overvoltage circuit means for preventing said means for applying and commutating from energizing any of the winding stages when the voltage to be applied to the winding stages exceeds a predetermined maximum value.

9. A control system as set forth in claim 6 wherein said means for applying and commutating includes switching transistors connected to the winding stages of the motor, and the control system further comprises means for preventing the second pulse width modulated series of pulses from actuating said means for applying and commutating when a level of saturation voltage across one or more of said switching transistors exceeds a predetermined value.

10. A control system as set forth in claim 9 further comprising overvoltage circuit means for preventing said means for applying and commutating from energizing any of the winding stages when the voltage to be applied to the winding stages exceeds a predetermined maximum value.

11. A control system as set forth in claim 1 wherein said means for applying and commutating includes switching transistors, and the control system further comprises means connected to each of said switching transistors for recovering energy released by a decaying magnetic field of each deenergized winding stage when switching occurs.

12. A control system as set forth in claim 11 further including a neutral voltage supply line for connection to each of the winding stages and a common line connected to each of said switching transistors, and wherein said means for recovering energy includes a resistor connected to said neutral line, a capacitor connected to said common line and having a series connection with the resistor, and diodes respectively connected between the switching transistors and the series connection.

13. A control system as set forth in claim 1 wherein said means for applying and commutating includes switching transistors which have a saturation voltage when switched on, and the control system further comprises means for preventing the second pulse width modulated series of pulses from actuating said means for applying and commutating when the saturation voltage across one or more of said switching transistors exceeds a predetermined level.

14. A control system as set forth in claim 13 wherein said preventing means includes means for sensing the voltages across each of said switching transistors, the control system further comprising means for providing to said preventing means a signal depending on the angular position of the rotatable assembly, the signal identifying each switching transistor which is switched on so that said preventing means is responsive only to voltage across each switching transistor that is switched on.

15. A control system as set forth in claim 1 wherein said means for generating includes means for producing the second series of pulses as a series of ramp voltages, and said means for modulating includes means for supplying an average value level representing an average of the first pulse width modulated series of pulses, and means for producing each width modulated pulse in the second pulse width modulated series of pulses to begin when each ramp begins and to end no later than when each ramp voltage reaches the average value level.

16. A control system as set forth in claim 1 further comprising overvoltage circuit means for preventing said applying and commutating means from energizing any of the winding stages when the voltage to be applied to the winding stages exceeds a predetermined maximum value.

17. A control system as set forth in claim 1 further comprising means for interrupting the second pulse width modulated series of pulses when the first series of pulses ceases pulsating for a predetermined period of time.

18. A control system as set forth in claim 1 further comprising means for counting the second series of pulses, means for repeatedly resetting said means for counting unless the first series of pulses ceases pulsating, said means for counting producing an electrical output when a predetermined count is reached after the pulses cease, and means responsive to an occurrence of the electrical output for interrupting the second pulse width modulated series of pulses.

19. A control system as set forth in claim 1 further comprising resettable means for counting the second series of pulses to produce a particular electrical output only when a predetermined number is reached and repeatedly resetting itself so that the predetermined number is not reached unless the first series of pulses becomes a substantially constant voltage that persists for a time period during which the predetermined number of pulses in the second series of pulses occur, and means responsive to an occurrence of the particular electrical output for preventing the second pulse width modulated series of pulses from actuating said means for applying and commutating.

20. A control system as set forth in claim 1 wherein said means for generating includes means for producing the second series of pulses with a higher repetition rate than the first series of pulses.

21. A control system as set forth in claim 1 further comprising means for comparing the magnitude of current flowing in the motor with a predetermined maximum value and means connected to said comparing means for preventing the applying and commutating means from energizing the winding stages when the motor current exceeds the predetermined maximum value.

22. A control system as set forth in claim 1 further comprising means for sensing angular position of the rotatable assembly and means for providing to said applying and commutating means a commutation signal indicative of a predetermined angular position of the rotatable assembly when the rotatable assembly reaches the predetermined angular position.

23. A control system for an electronically commutated motor having a stationary assembly with a plurality of winding stages and further having a rotatable assembly, and which control system is to be supplied with an externally derived first pulse width modulated series of pulses having a varying first duty cycle, the control system comprising:

means for generating a second series of pulses and means for modulating their width in response to the first series of pulses to produce a second pulse width modulated series of pulses;

means for applying a voltage to one or more of the winding stages at a time in accordance with the second pulse width modulated series of pulses and commutating the winding stages in a preselected sequence to rotate the rotatable assembly;

resettable means for counting the second series of pulses to produce a particular electrical output only when a predetermined number is reached and repeatedly resetting itself so that the predetermined number is not reached unless the first series of pulses becomes a substantially constant voltage that persists for a first time period during which the predetermined number of pulses in the second series of pulses occur; and means responsive to an occurrence of the particular electrical output for preventing the second pulse width modulated series of pulses from actuating said means for applying and commutating.

24. A control system as set forth in claim 23 wherein the first series of pulses have a repetition period and the first time period exceeds the repetition period.

25. A control system as set forth in claim 24 wherein said means for modulating includes means for averaging the first series of pulses to produce a control signal having a level that varies when the duty cycle of the first series of pulses varies and means for modulating the second series of pulses in width in response to the control signal so that the second pulse width modulated series of pulses have a second duty cycle corresponding to the level of the control signal as it varies.

26. A control system as set forth in claim 23 further comprising means for also preventing the second pulse width modulated series of pulses from actuating said means for applying and commutating when a level of electrical current in one or more of the winding stages exceeds a predetermined level.

27. A control system as set forth in claim 26 further comprising overvoltage circuit means for preventing said means for applying and commutating from energizing any of the winding stages when the voltage to be applied to the winding stages exceeds a predetermined maximum value.

28. A control system as set forth in claim 23 wherein said means for applying and commutating includes switching transistors connected to the winding stages of the motor, and the control system further comprises means for preventing the second pulse width modulated series of pulses from actuating said means for applying and commutating when a level of saturation voltage across one or more of said switching transistors exceeds a predetermined value.

29. A control system as set forth in claim 28 further comprising overvoltage circuit means for preventing said means for applying and commutating from energizing any of the winding stages when the voltage to be applied to the winding stages exceeds a predetermined maximum value.

30. Blower apparatus for use with a heat exchanger to heat or cool a compartment, comprising:

a fan for moving air over the heat exchanger to condition the air and thereby heat or cool the compartment by blowing conditioned air thereto;

an electronically commutated motor including a stationary armature having a core and at least two energizable winding stages arranged to establish a predetermined number of magnetic poles, and a permanent magnet rotor coupled to said fan and adapted to rotate in response to the magnetic poles established by said winding stages;

sensor means for sensing temperature within the compartment;

level setting means for variably setting a desired level of temperature for the compartment;

means connected to said sensor means and to said level setting means for deriving a first pulse width modulated series of pulses having a first duty cycle varying as a function of the the temperature and the desired level, which first duty cycle is subject to sudden changes which would cause a substantial inrush current to said motor if used directly for control purposes;

means for generating a second series of pulses and means for modulating their width in response to the first series of pulses to produce a second pulse width modulated series of pulses that has a second duty cycle which varies less rapidly over time than the first duty cycle varies when the first duty cycle changes suddenly; and means for applying a voltage to one or more of said winding stages at a time in accordance with the second pulse width modulated series of pulses and commutating said winding stages in a preselected sequence to rotate said rotor and said fan with a variable speed to blow conditioned air to the compartment at a rate related to the second duty cycle, whereby inrush current to said motor is substantially reduced when the first duty cycle changes suddenly.

31. Blower apparatus as set forth in claim 30 wherein said means for modulating includes means for averaging the first series of pulses to produce a control signal having a level that varies when the duty cycle of the first series of pulses changes, and means for modulating the second series of pulses in width in response to the control signal so that the second pulse width modulated series of pulses have the second duty cycle corresponding to the level of the control signal as it varies.

32. Blower apparatus as set forth in claim 31 wherein said means for averaging the first series of pulses includes terminals across which a resistance is connected in series with a capacitor, the first series of pulses being supplied to the terminals and a resulting voltage across said capacitor comprising the control signal.

33. Blower apparatus as set forth in claim 32 further comprising means for discharging said capacitor when the terminals have a substantially constant voltage for a predetermined period of time.

34. Blower apparatus as set forth in claim 30 further comprising means for preventing the second pulse width modulated series of pulses from actuating said means for applying and commutating when the first duty cycle is less than a predetermined value.

35. Blower apparatus as set forth in claim 30 wherein said means for generating includes means for producing the second series of pulses with a higher repetition rate than the first series of pulses.

36. Blower apparatus as set forth in claim 30 further comprising resettable means for counting the second series of pulses to produce a particular electrical output when a predetermined number is reached and repeatedly resetting itself so that the predetermined number is not reached unless the first series of pulses becomes a substantially constant voltage that persists for a first time period during which the predetermined number of pulses in the second series of pulses occur, and means responsive to an occurrence of the particular electrical output for preventing the second pulse width modulated series of pulses from actuating said means for applying and commutating.

37. Blower apparatus as set forth in claim 30 wherein said means for generating includes means for producing the second series of pulses as a series of ramp voltages, and said means for modulating includes means for supplying an average value level representing an average of the first pulse width modulated series of pulses, and means for producing each width modulated pulse in the second pulse width modulated series of pulses to begin when each ramp begins and to end no later than when each ramp voltage reaches the average value level.

38. Blower apparatus as set forth in claim 30 further comprising means for preventing the second pulse width modulated series of pulses from actuating said means for applying and commutating when a level of electrical current in one or more of said winding stages exceeds a predetermined value.

39. Blower apparatus as set forth in claim 38 further comprising overvoltage circuit means for preventing said means for applying and commutating from energizing any of said winding stages when the voltage to be applied to said winding stages exceeds a predetermined maximum value.

40. Blower apparatus as set forth in claim 30 wherein said means for applying and commutating includes switching transistors connected to said winding stages, and the apparatus further comprises means for preventing the second pulse width modulated series of pulses from actuating said means for applying and commutating when a level of saturation voltage across one or more of said switching transistors exceeds a predetermined value.

41. Blower apparatus as set forth in claim 30 further comprising overvoltage circuit means for preventing said means for applying and commutating from energizing any of said winding stages when the voltage to be applied to said winding stages exceeds a predetermined maximum value.

42. A control system for an electronically commutated motor having a stationary assembly with a plurality of winding stages and further having a rotatable assembly, the control system comprising:

means for deriving a first pulse width modulated series of pulses having a width-to-period ratio that is subject to high rates of change that could produce motor current transients if the pulses were used directly for control purposes;

means for generating a second series of pulses and means for modulating their width in response to the first series of pulses to produce a second pulse width modulated series of pulses that has a second width-to-period ratio limited in its rate-of-change to less than a predetermined value regardless of the rate of change of the width-to-period ratio of the first series of pulses;

means for applying a voltage to the electric motor in accordance with the second pulse width modulated series of pulses and commutating the winding stages in a preselected sequence to rotate the rotatable assembly, whereby motor current transients are substantially reduced when the width-to-period ratio of the first series of pulses undergoes a high rate of change; and means for preventing the second pulse width modulated series of pulses from actuating said means for applying and commutating when the first series of pulses becomes a substantially constant voltage, regardless of level, that persists for a predetermined period of time.

43. An electronically commutated motor system comprising:

an electronically commutated motor having a stationary assembly with a plurality of winding stages and further having a rotatable assembly;

means for deriving a first pulse width modulated series of pulses having a first duty cycle which is subject to sudden changes which would cause a substantial inrush current to said motor if used directly for control purposes;

means for generating a second series of pulses and means for modulating their width in response to the first series of pulses to produce a second pulse width modulated series of pulses that has a second duty cycle which varies less rapidly than the first duty cycle varies when the first duty cycle changes suddenly; and means for applying a voltage to one or more of said winding stages at a time in accordance with the second pulse width modulated series of pulses and commutating said winding stages in a preselected sequence to rotate said rotatable assembly, whereby inrush current to said motor is substantially reduced when the first duty cycle changes suddenly.

44. An electronically commutated motor system as set forth in claim 43 wherein said means for modulating includes means operable generally for averaging the first pulse width modulated series of pulses to produce a control signal having a level that varies when the first duty cycle changes, and means for modulating the second series of pulses in width in response to the control signal so that the second pulse width modulated series of pulses have the second duty cycle corresponding to the level of the control signal as it varies.

45. An electronically commutated motor system as set forth in claim 44 wherein said means for averaging the first series of pulses includes terminals across which a resistance is connected in series with a capacitor, the first series of pulses being supplied to the terminals and a resulting voltage across said capacitor comprising the control signal.

46. An electronically commutated motor system as set forth in claim 45 further comprising means for discharging said capacitor when the terminals have a substantially constant voltage for a predetermined period of time.

47. An electronically commutated motor system as set forth in claim 43 wherein said means for generating includes means for producing the second series of pulses as a series of ramp voltages, and said means for modulating includes means for supplying an average value level representing an average of the first pulse width modulated series of pulses, and means for producing each width modulated pulse in the second pulse width modulated series of pulses to begin when each ramp begins and to end no later than when each ramp voltage reaches the average value level.

48. An electronically commutated motor system as set forth in claim 43 further comprising means for preventing the second pulse width modulated series of pulses from actuating said means for applying and commutating when the first series of pulses ceases pulsating for a predetermined period of time.

49. An electronically commutated motor system as set forth in claim 43 further comprising resettable means for counting the second series of pulses to produce a particular electrical output only when a predetermined number is reached and repeatedly resetting itself so that the predetermined number is not reached unless the first pulse width modulated series of pulses becomes a substantially constant voltage that persists for an entire time period during which the predetermined number of pulses in the second series of pulses occur, and means responsive to an occurrence of the particular electrical output for preventing the second pulse width modulated series of pulses from actuating said means for applying and commutating.

50. An electronically commutated motor system as set forth in claim 43 further comprising position sensing and providing means for sensing the angular position of said rotatable assembly and for providing to said means for applying and commutating a commutation signal indicative of a predetermined angular position of said rotatable assembly to commutate said winding stages when said rotatable assembly reaches the predetermined angular position.

51. An electronically commutated motor system comprising:

an electronically commutated motor having a stationary assembly with a plurality of winding stages and a rotatable assembly;

means for deriving a first pulse width modulated series of pulses having a varying first duty cycle;

means for generating a second series of pulses and means for modulating their width in response to the first series of pulses to produce a second pulse width modulated series of pulses;

means for applying a voltage to one or more of said winding stages at a time in accordance with the second pulse width modulated series of pulses and commutating said winding stages in a preselected sequence to rotate said rotatable assembly;

resettable means for counting the second series of pulses to produce a particular electrical output only when a predetermined number is reached and repeatedly resetting itself so that the predetermined number is not reached unless the first series of pulses becomes a substantially constant voltage for a first time period during which the predetermined number of pulses in the second series of pulses occur; and means responsive to an occurrence of the particular electrical output for preventing the second pulse width modulated series of pulses from actuating said means for applying and commutating.

52. An electronically commutated motor system as set forth in claim 51 wherein the first series of pulses have a repetition period and the first time period exceeds the repetition period.

53. A method of controlling an electronically commutated motor having a stationary assembly with a plurality of winding stages and further having a rotatable assembly, which method is for use with an externally derived first pulse width modulated series of pulses having a first duty cycle which is subject to sudden changes which would cause a substantial inrush current to the motor if used directly for control purposes, the method comprising the steps of:

generating a second series of pulses and modulating their width in response to the first series of pulses to produce a second pulse width modulated series of pulses that has a second duty cycle which varies less rapidly over time than the first duty cycle varies when the first duty cycle changes suddenly; and applying a voltage to one or more of the winding stages at a time in accordance with the second pulse width modulated series of pulses and commutating the winding stages in a preselected sequence to rotate the rotatable assembly, whereby inrush current to the motor is substantially reduced when the first duty cycle changes suddenly.

54. A method of controlling an electronically commutated motor having a stationary assembly with a plurality of winding stages and further having a rotatable assembly, which method is for use with an externally derived first pulse width modulated series of pulses having a varying first duty cycle, the method comprising the steps of:

generating a second series of pulses and modulating their width in response to the first series of pulses to produce a second pulse width modulated series of pulses;

counting the second series of pulses to produce a particular electrical output only when the first series of pulses becomes a substantially constant voltage that persists for an entire time period during which a predetermined number of pulses in the second series of pulses are counted;

applying a voltage to one or more of the winding stages at a time in accordance with the second pulse width modulated series of pulses and commutating the winding stages in a preselected sequence to rotate the rotatable assembly; and discontinuing the applying step when the particular electrical output occurs.

55. A method of controlling an electronically commutated motor having a stationary assembly with a plurality of winding stages and further having a rotatable assembly, which method is for use with an externally derived first pulse width modulated series of pulses having a width-to-period ratio that is subject to high rates of change that could produce motor current transients if the pulses were used directly for control purposes, the method comprising the steps of:

generating a second series of pulses and modulating their width in response to the first series of pulses to produce a second pulse width modulated series of pulses that has a second width-to-period ratio limited in its rate-of-change to less than a predetermined value regardless of the rate of change of the width-to-period ratio of the first series of pulses;

applying a voltage to the electric motor in accordance with the second pulse width modulated series of pulses and commutating the winding stages in a preselected sequence to rotate the rotatable assembly, whereby motor current transients are substantially reduced when the width-to-period ratio of the first series of pulses undergoes a high rate of change; and terminating the applying step when the first series of pulses becomes a substantially constant voltage, regardless of level, that persists for a predetermined period of time.

56. The method as set forth in claim 55 wherein the generating and modulating step includes averaging the first pulse width modulated series of pulses to produce a control signal having a level that varies when the width- to-period ratio of the first series of pulses undergoes a change, and generating the second series of pulses and modulating their width in response to the control signal to produce the second pulse width modulated series of pulses having a width-to-period ratio corresponding to the control signal as it varies.

57. A method for operating a blower system having a fan for moving air over a heat exchanger to heat or cool a compartment, and an electronically commutated motor including a stationary armature having a core and at least two energizable winding stages arranged to establish a predetermined number of magnetic poles, and a permanent magnet rotor coupled to the fan and adapted to rotate in response to the magnetic poles established by the winding stages, the method comprising the steps of:

sensing temperature within the compartment;

variably setting a desired level of temperature for the compartment;

deriving a first pulse width modulated series of pulses having a first duty cycle varying as a function of the temperature and the desired level, which first duty cycle is subject to sudden changes which would cause a substantial inrush current to the motor if used directly for control purposes;

generating a second series of pulses and modulating their width in response to the first series of pulses to produce a second pulse width modulated series of pulses that has a second duty cycle which varies less rapidly over time than the first duty cycle varies when the first duty cycle changes suddenly; and applying a voltage to one or more of the winding stages at a time in accordance with the second pulse width modulated series of pulses and commutating the winding stages in a preselected sequence to rotate the rotor and the fan with a variable speed to blow conditioned air to the compartment at a rate related to the second duty cycle, whereby inrush current to the motor is substantially reduced when the first duty cycle changes suddenly.

* * * * *